(12) United States Patent
Strobel et al.

(10) Patent No.: US 10,406,628 B2
(45) Date of Patent: Sep. 10, 2019

(54) DEVICE FOR WELDING ELECTRICAL CONDUCTORS

(71) Applicant: SCHUNK SONOSYSTEMS GMBH, Wettenberg (DE)

(72) Inventors: Heiko Strobel, Münzenberg (DE); Peter Wagner, Wettenberg (DE); Dieter Stroh, Wettenberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 508 days.

(21) Appl. No.: 15/035,382

(22) PCT Filed: Nov. 6, 2014

(86) PCT No.: PCT/EP2014/073941
§ 371 (c)(1),
(2) Date: May 9, 2016

(87) PCT Pub. No.: WO2015/067700
PCT Pub. Date: May 14, 2015

(65) Prior Publication Data
US 2018/0200827 A1 Jul. 19, 2018

(30) Foreign Application Priority Data
Nov. 11, 2013 (DE) .................. 10 2013 222 938

(51) Int. Cl.
*B23K 20/00* (2006.01)
*B23K 20/10* (2006.01)
(Continued)

(52) U.S. Cl.
CPC ......... *B23K 20/10* (2013.01); *H01R 43/0263* (2013.01); *B23K 2101/38* (2018.08)

(58) Field of Classification Search
CPC .................. B23K 2201/38; B23K 1/06; B23K 20/10–106; B23K 2201/36; H01R 43/0263
(Continued)

(56) References Cited

U.S. PATENT DOCUMENTS 4,869,419 A * 9/1989 Nuss ..................... B23K 20/106
228/110.1
5,781,991 A * 7/1998 Papon ................ H01R 43/0256
29/828
(Continued)

FOREIGN PATENT DOCUMENTS

CN 1871096 A 11/2006
CN 1997481 A 7/2007
(Continued)

OTHER PUBLICATIONS

International Search Report dated Jun. 2, 2014 in connection with PCT/EP2013/073941.
(Continued)

*Primary Examiner* — Kiley S Stoner
(74) *Attorney, Agent, or Firm* — Quarles & Brady LLP

(57) ABSTRACT

The invention relates to a device for welding rod-shaped electrical conductors (28, 29) provided with an outer insulating sheath (30), the device comprising a compression space (18) for receiving connecting regions of the conductors to be connected to each other, said compression space comprising at least one guiding element (41, 42) for axially positioning the conductors.

9 Claims, 4 Drawing Sheets

Figure 5:
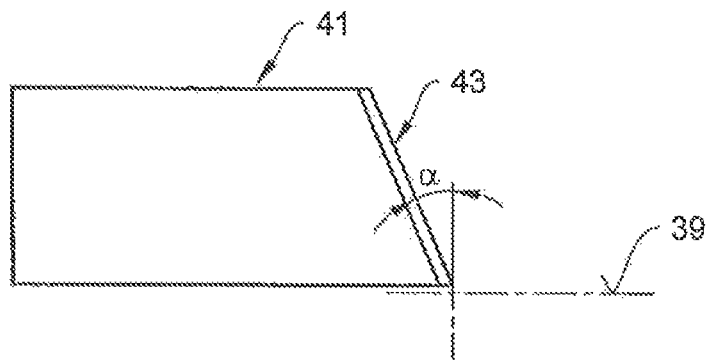

(51) Int. Cl.
*H01R 43/02* (2006.01)
*B23K 101/38* (2006.01)

(58) Field of Classification Search
USPC .............................................. 228/110.1, 1.1
See application file for complete search history.

(56) References Cited

U.S. PATENT DOCUMENTS

| | | | |
|---|---|---|---|
| 5,815,916 | A | 10/1998 | Papon |
| 9,787,001 | B2 * | 10/2017 | Nakayama ............. H01R 4/024 |
| 2003/0098332 | A1 * | 5/2003 | Loprire ................. B23K 20/10 |
| | | | 228/110.1 |
| 2003/0181100 | A1 | 9/2003 | Keiji et al. |
| 2007/0257088 | A1 * | 11/2007 | Steiner ................. B23K 20/004 |
| | | | 228/110.1 |
| 2008/0032569 | A1 * | 2/2008 | Steiner ................... B23K 20/10 |
| | | | 439/874 |
| 2012/0298645 | A1 * | 11/2012 | Kleespiess ............. H01R 4/029 |
| | | | 219/137 R |
| 2014/0194015 | A1 * | 7/2014 | Schmidt ............... H01H 1/5866 |
| | | | 439/877 |
| 2016/0294140 | A1 * | 10/2016 | Trube ................. H01R 43/0263 |

FOREIGN PATENT DOCUMENTS

| | | | |
|---|---|---|---|
| DE | 102008025585 A1 * | 12/2009 | ......... B23K 11/0026 |
| DE | 102015222013 B3 * | 11/2016 | ............. B23K 37/04 |
| EP | 1 765 545 A1 | 3/2007 | |
| EP | 1677942 B1 | 12/2009 | |
| JP | 2003282195 A * | 10/2003 | ............. H01R 4/023 |

OTHER PUBLICATIONS

PCT English Language Translation of the International Preliminary Report on Patentability, PCT/EP2014/073941, dated May 26, 2016.
The State Intellectual Property Office of P.R. China, First Office Action and Search Report, Application No. 201480061611.5, dated Nov. 1, 2017.

* cited by examiner

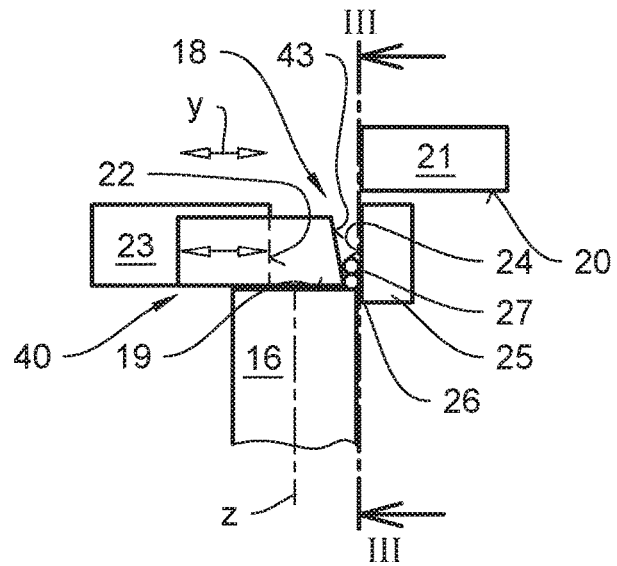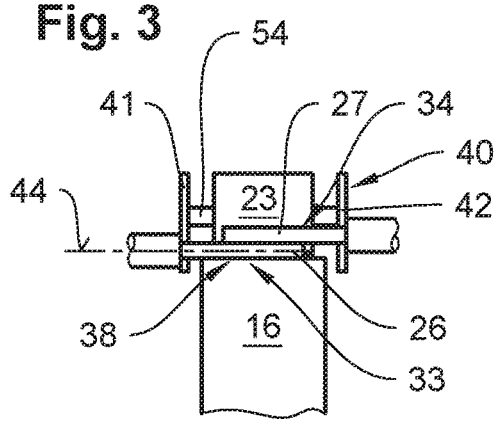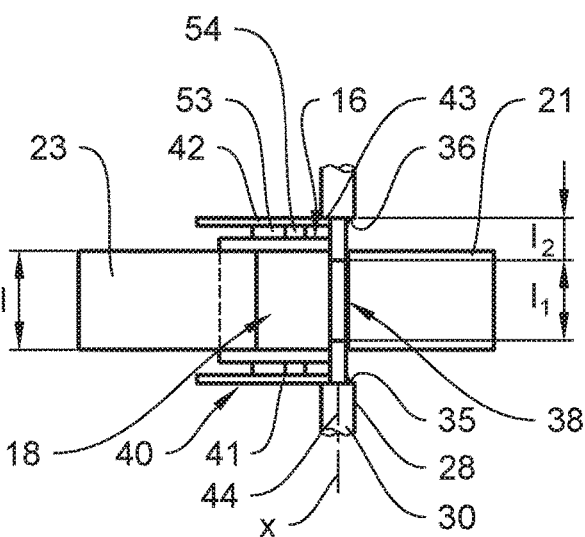

DEVICE FOR WELDING ELECTRICAL CONDUCTORS

CROSS-REFERENCE TO RELATED APPLICATIONS

This application represents the national stage entry of PCT International Application No. PCT/EP2014/073941 filed Nov. 6, 2014, which claims priority of German Patent Application 10 2013 222 938.0 filed Nov. 11, 2013, the contents of which are hereby incorporated herein by reference for all purposes.

The present invention relates to a device for welding rod-shaped electrical conductors provided with an outer insulating sheath and having blank regions free of the sheath, whose length is defined by an axial sheath end surface, the device comprising a compression space for receiving connecting regions of the conductors to be connected to each other, the compression space being limited in a first axial direction at two opposing sides by a working surface of a sonotrode transmitting ultrasonic vibrations in the first axial direction and by an opposing surface of an opposing electrode and in a second axial direction at two opposing sides by a limiting surface of a slider element displaceable in the second axial direction and by a limiting surface of a limiting element, the compression space comprising at least one guiding element arranged laterally to the slider element and moveable relative to the slider element in the second axial direction, and the guiding element having a guiding edge for positioning a conductor in the second axial direction relative to the limiting surface of the limiting element.

A device of the kind mentioned above is known from EP 1 765 545 A1. Before the ultrasonic welding process is performed, the blank regions of conductors to be welded together are placed into the open compression space in such a manner that sections of the blank regions of the conductors forming the connecting regions of the welding node when vibrations are applied by the sonotrode in a first axial direction are positioned in front of the limiting surface of the limiting element opposite the slider element in an overlapping stacked arrangement and aligned parallel to each other. To achieve this relative positioning with respect to the limiting surface, the slider element of the known device is provided with guiding elements arranged laterally to the slider element and extending in the second axial direction, i.e. parallel to the path of displacement of the slider element, and each having a guiding edge extending in an inclined manner toward the limiting surface of the limiting element in a preferred embodiment so that the guiding edges form a V-shaped recess together with the limiting surface of the limiting element, said recess ensuring the desired unambiguous positioning of the blank regions of the conductors in the second axial direction when the conductors are inserted into the open compression space.

In contrast to the positioning aid described above for correctly positioning the blank regions of the conductors in the second axial direction, the correct positioning of the blank regions in the compression space in the longitudinal direction of the conductors, i.e. in a third axial direction, in such a manner that the connecting regions form in the desired length during the subsequent application of vibrations depends on the skill of the operator inserting the conductors into the compression space.

Thus, it is possible that defective weld nodes are ultimately produced or, in the best case, that it cannot be ensured that tolerance requirements regarding the geometrical parameters of the weld node, i.e. in particular the length of the connecting regions, are met.

Therefore, the object of the present invention is to improve the manufacturing quality in the production of ultrasonically welded connections.

This object is attained by a device having the features of claim 1.

In case of the device according to the invention, the guiding element is provided with a stop edge for axially positioning the sheath end surface, the distance between the stop edge and the working surface of the sonotrode being selected in such a manner that when the sheath end surface abuts against the stop edge and the blank region is aligned parallel to the working surface of the sonotrode and the limiting surface of the limiting element in a third axial direction, a defined length of the blank region extends within the compression space.

Thus, the device according to the invention makes it possible that an operator inserting the blank regions of the conductors into the open compression space has to merely make sure that the sheath end surfaces of the conductors abut against the stop edge of the guiding element so as to ensure that a section of defined length of the blank region of the conductor protrudes into the compression space.

Thus, positioning of the conductors in their longitudinal axial direction is no longer dependent on the visual judgement of the operator but adjustable in a reproducible manner by means of the stop edge.

The conductors welded together in the device according to the invention are usually rod-shaped conductors, i.e. conductors substantially determined in their dimension by their longitudinal extension, which additionally have an at least slight flexural stiffness so as to maintain their longitudinal extension despite their flexible nature as long as there is no radial load acting on the conductors. Conductors of this kind can be realized as an insulated stranded wire, for example, which, in particular if designed as a stranded wire and combined in stranded-wire packets made of a plurality of stranded wires, can be inserted into the compression space.

Preferably, the stop edge has an edge thickness smaller than 2 mm so that the desired effect of the stop edge as a resistance against axial displacement of the sheath end surface beyond the stop edge is ensured even if a conductor is moved in the direction of the stop edge at a small relative inclination. Of course it is generally true that the smaller the edge thickness of the stop edge, the more pronounced the stop action can be realized; this is true even if due to a sheath realized with a particularly low sheath thickness, the sheath end surface forms a shoulder of minimal height with respect to the blank region, allowing the shoulder to easily slide across an edge with a comparably substantially larger edge thickness even at a small relative inclination toward the stop edge.

Hence, the formation of an edge thickness smaller than 1.5 mm or even smaller than 1 mm is particularly preferred, the selection of the actual edge thickness ultimately being a compromise between the desired stop effect and, for example, avoiding a risk of injury for the operator at edge thicknesses that are too small, i.e. stop edges that are too sharp.

It is particularly advantageous if the stop edge is formed by the guiding edge, providing the guiding edge with a corresponding double function.

If the guiding element is provided with an adjusting device, which allows positioning the stop edge with respect to the working surface of the sonotrode in the third axial direction, the length of the section of the blank region protruding into the compression space can be variably adjusted in a comfortable or particularly time-saving manner.

If the adjusting device comprises a coupling device between the guiding element and the slider element, the positioning of the stop edge can be adjusted by adjusting the guiding element with respect to the slider element.

In the case in which the stop edge is formed on a stop body arranged on the guiding element, the desired positioning of the stop edge can be adjusted by replacing the stop body, if applicable.

In the following description, a preferred embodiment of the device will be explained in more detail with the aid of the drawing.

Figure 6:
Figure 7:
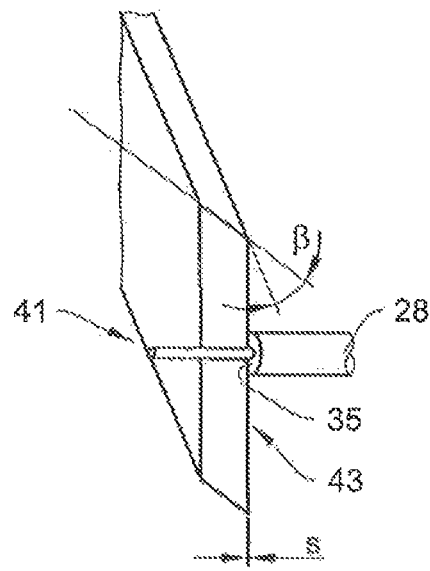

In the drawing:

FIG. 1: shows a front view of a compression space of an ultrasonic welding device with two connecting regions of conductors to be welded together arranged one on top of the other in a stacked arrangement;

FIG. 2: shows the compression space illustrated in FIG. 1 in a top view;

FIG. 3: shows the compression space illustrated in FIG. 1 in a sectional view along section line III-III;

FIG. 4: shows the compression space illustrated in FIG. 1 in the closed position;

FIG. 5: shows a side view of a guiding element;

FIG. 6: shows a top view of the guiding element illustrated in FIG. 5;

FIG. 7: shows an isometric illustration of the guiding element illustrated in FIG. 5

Figure 8:
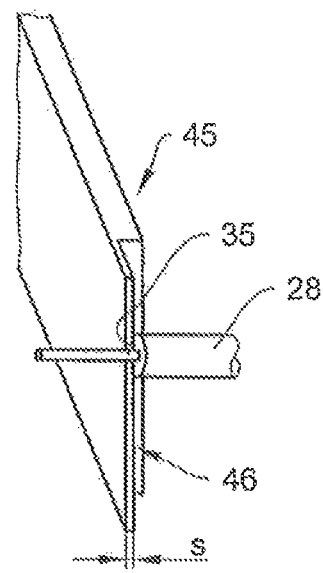
Figure 9:
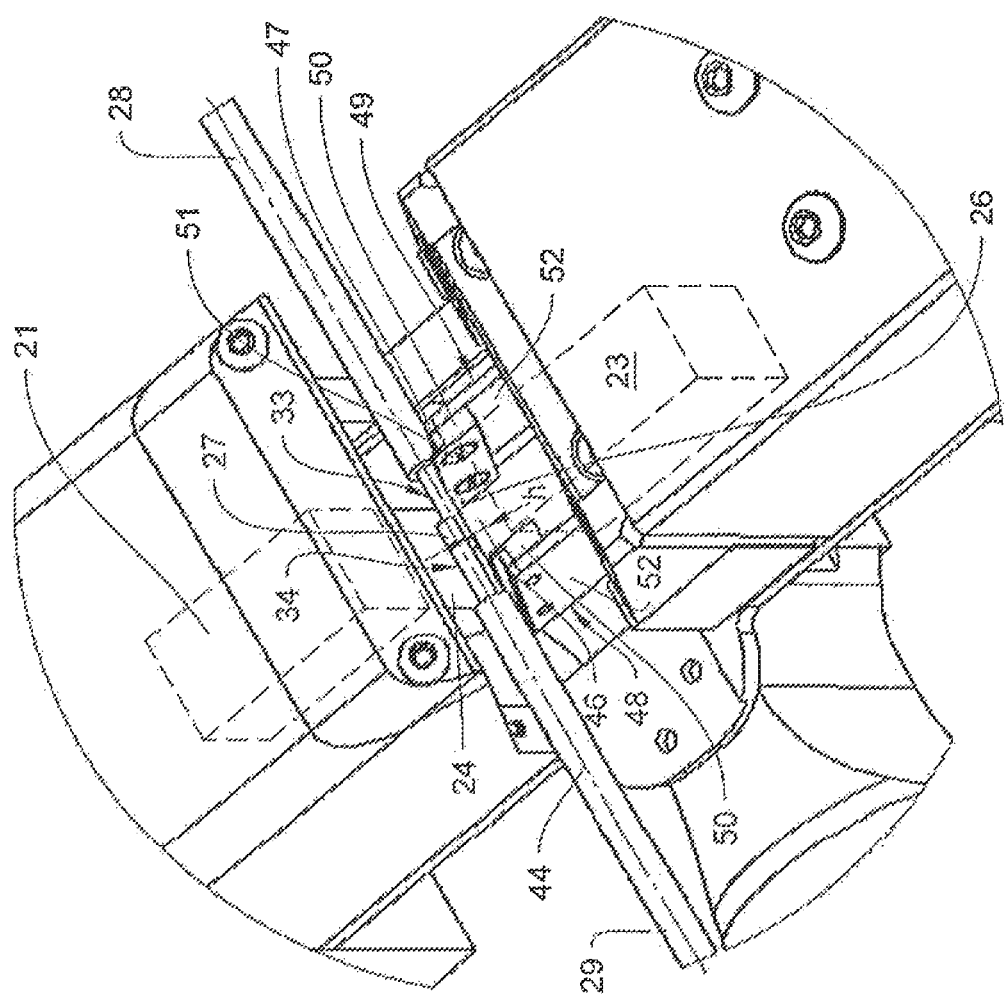
Figure 10:
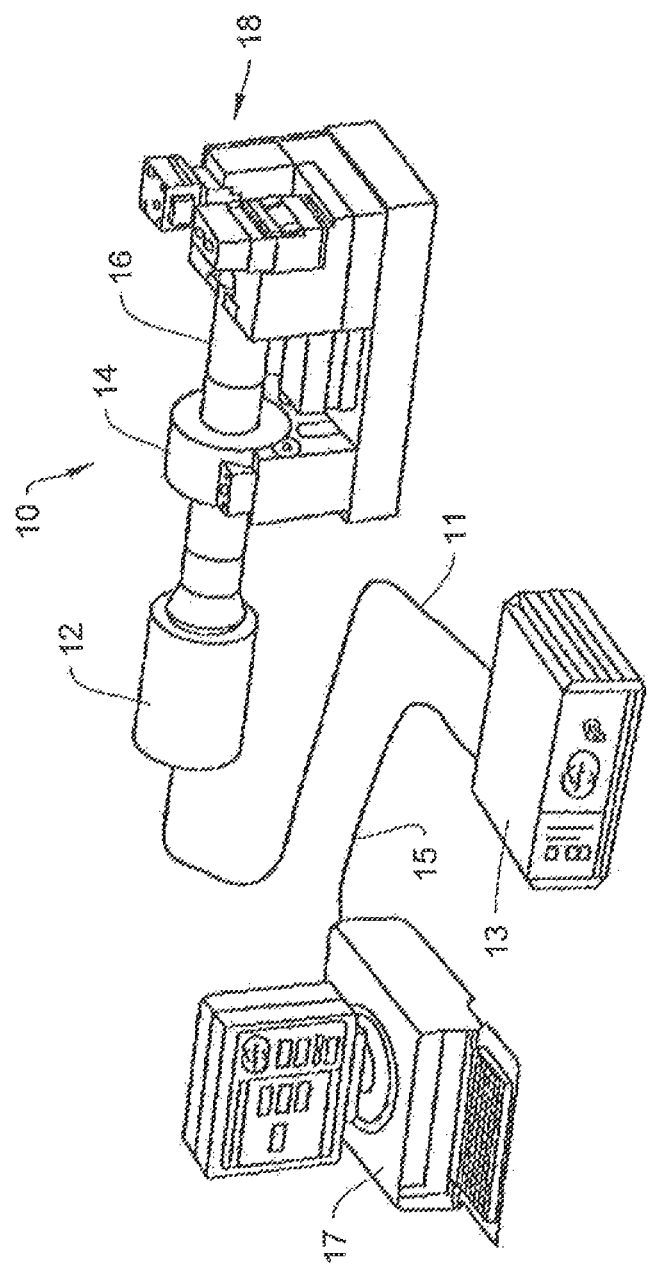

FIG. 8: shows an isometric illustration of an alternative embodiment of a guiding element;

FIG. 9: shows an isometric illustration of a compression space comprising guiding elements; and FIG. 10: shows a principal illustration of an ultrasonic welding device.

FIG. 10 shows the basic arrangement of components of an ultrasonic welding device 10, which comprises a converter 12, a booster 14 and a sonotrode 16. As illustrated in particular in FIG. 1, the sonotrode 16 or an opposing electrode 21 associated therewith limit a compression space in a first axial direction (z-axis), said compression space 18 being adjustable in height and width so as to be able to adjust the cross-section of the compression space 18 to the number or the cross-section of conductors to be welded together. The converter 12 is connected with a generator 13 via a cable 11, and the generator itself is connected to a computer 17 via a cable 15 to input welding parameter or the cross-section geometry of the conductors to be welded together. The power output of the generator 13 can then be determined to retrieve the required welding parameters by means of a program stored in the computer and to correspondingly generate ultrasonic vibrations by means of the converter, which are transmitted to the sonotrode 16 or to the working surface 19 (FIG. 1) of the sonotrode 16 via the booster.

FIGS. 1 and 4 show the substantial elements of the compression space 18, whose cross-section can be adjusted, i.e., whose height and width can be adjusted in the embodiment examples. The compression space 18 is limited in the first axial direction (z-axis) at two opposing sides by a working surface 19 of the sonotrode 16 transmitting ultrasonic vibrations and an opposing surface 20 of an opposing electrode 21 being displaceable in a second axial direction (y-axis). In the second axial direction, which is illustrated in FIG. 1 by the y-axis, the compression space 18 is limited at two opposing sides by a limiting surface 22 of a slider element displaceable in the direction of the y-axis and by a limiting surface of a limiting element 25. The limiting surface is displaceable in the direction of the z-axis, as is the opposing electrode 21.

In the embodiment of the compression space 18 illustrated in FIG. 1, two connecting regions 26, 27 of conductors 28, 29 to be connected together by way of an ultrasonic welding connection are arranged one overlapping the other in a stacked arrangement on the working surface 19 of the sonotrode 16, FIG. 1 showing the connecting regions 26, 27 immediately after insertion into the open compression space 18.

FIG. 4 shows the compression space 18 in the closed configuration, in which the components limiting the compression space 18, i.e. the sonotrode 16, the opposing electrode 21, the slider element 23 and the limiting element 25, are moved up against one another that the compression space 18 now reduced in volume forms a cavity 37 that allows compressing and connecting the connecting regions 26, 27 in a friction-welding process to form a weld node when mechanical vibrations of the sonotrode 16 are applied to the connecting regions 26, 27 of the conductors 28, 29.

As becomes clear from a combined view of FIGS. 1 to 3, the compression space 18 is provided with a guiding device 40, which, in the case at hand, comprises two guiding elements 41, 42 arranged on both sides of the slider element 23 and displaceable relative to the slider element 23 in the second axial direction (y-axis), as illustrated by the double arrow indicated in FIG. 1. Each of the guiding elements 41, 42 is provided with a stop edge 43 for axially positioning the connecting regions 26, 27 of the conductors 28, 29 in the third axial direction (x-axis) within the compression space 18. At the same time, the stop edges 43 of the present embodiment example of the guiding device 40 are realized as guiding edges, which, when the blank regions 33, 34 of the conductors 28, 29 are inserted into the open compression space 18, serve to position the blank regions 33, 34 in the second axial direction (y-axis) in such a manner that the blank regions 33, 34 abut against the limiting surface 24 of the limiting element 25 or are at least arranged directly adjacent to the limiting surface 24.

Once the blank regions 33, 34 are positioned in the direction of the y-axis or in the radial direction with respect to a longitudinal axis 44 of the conductors 28, 29, the stop edges 43 allow the conductors 28, 29 and their blank regions 33, 34 to be axially positioned, as can be taken in particular from FIG. 2, in that sheath end surfaces 35, 36 of an insulating sheath 30 of the conductors 28, 29 are made to axially abut against the stop edges 43 of the guiding elements 41, 42 during the insertion process. As shown in particular in FIG. 2, the axial abutment of the sheath end surfaces 35, 36 against the stop edges 43 thus determines the length l of the blank regions 33, 34 of the conductors 28, 29 that protrudes into the compression space 18. As illustrated in FIG. 2 and FIG. 3, the guiding elements 41, 42 can include an adjusting device 53 allowing positioning of the stop edge 43 with respect to the working surface 19 of the sonotrode 16 in the third axial direction (x-axis). The adjusting device 53 can also include a coupling device 54 between the at least one guiding elements 41, 42 and the slider element 23.

In the stacked arrangement of the blank regions 33, 34, which is illustrated as an example in FIG. 2 and serves to produce a continuous weld node 38 in such a way that the conductors 28, 29 connected via the continuous weld node 38 extend in opposite directions, the stop edges 43 of the guiding elements 41, 42 thus define the respective length l by which the blank regions 33, 34 extend within the compression space 18 in the third axial direction (x-axis) from different directions. In this way, on the one hand, the length $l_1$ of the connecting regions 26, 27 of the blank regions 33, 34 and thus the length of the continuous weld node produced by the ultrasonic welding process is defined. On the other hand, the length l by which the blank regions 33, 34 extend within the compression space 18 predetermines the length $l_2$, i.e. the distance that remains between the sheath end surfaces 35, 36 of the conductors 28, 29 and the connecting regions 26, 27, i.e. the continuous weld node 38, after production of the continuous weld node 38.

Thus, the desired node geometry is predefined by the stop edges 43 formed on the guiding elements 41, 42.

As becomes apparent from a combined view of FIGS. 1 and 4, once the compression space 18 has been closed by way of a corresponding adjusting motion of the opposing electrode 21, the slider element 23 and the limiting element 25, the guiding elements 41, 42 are moved out of the sphere of influence of the sonotrode 16 to prevent them from interfering with the subsequent ultrasonic welding process.

In FIGS. 5 and 6, a guiding element 41 comprising a stop edge 43, which simultaneously serves as a guiding edge for radially positioning the conductors 28, 29 as described above and has an angle of inclination α with respect to a working plane 39 defined by the working surface 19 of the sonotrode 16 (FIG. 1), is illustrated separately. The angle of inclination α is preferably selected according to the number and diameter of the conductors inserted into the compression space and is usually between and 60°.

FIG. 7 shows that the stop edge 43 is realized as an edge provided with a slope on one side and having an edge angle 3 so that an edge thickness $s_1$ is minimized and the edge thickness s virtually tends to zero.

FIG. 8 shows an alternative design of a guiding element 45 comprising a stop edge 46 realized as a stepped edge and being formed by a stepped design of a guiding edge of the guiding element 45.

Furthermore, FIGS. 7 and 8 illustrate the axial abutment of a sheath end surface 35 of a conductor 28 against the stop edge 43 and 46, respectively.

A design of stop edges 47 as stepped edges can also be taken from the embodiment of guiding elements 48, 49 illustrated in FIG. 9. As shown by the isometric illustration according to FIG. 9, the stop edges 47 are formed on a stop body 50 arranged on the respective guide element 48, 49. In the case at hand, the stop bodies 50 are removably connected to a support 52 of the respective guiding element 48, 49 by screw connections 51.

As the isometric illustration illustrates particularly clearly, the stop edge of the guiding elements 48, 49 serves as a guiding edge when the blank regions 33, 34 of the conductors 28, 29 are inserted, said guiding edge extending at an inclination to the limiting surface 42 of the limiting element 25 and to the working surface 19 of the sonotrode 16 in such a manner that the blank regions 33, 34 are radially positioned on the working surface 19 of the sonotrode 16 directly adjacent to the limiting surface when being radially guided along the stop edges 47. At the same time, the stop edges 47 make sure that a defined length l of the blank regions 33, 34 extends into the open compression space 18 when the sheath end surfaces 35, 36 axially abut against the stop edges 47.

In the embodiment example illustrated in FIG. 9, the height h or the section of the stop edges that protrudes beyond the support 52 in the radial direction with respect to the longitudinal axis 44 of the conductors 28, 29 is selected in such a manner that the height h is at least large enough that there is a radial contact between the stop edges 47 and the blank regions 33, 34, thus ensuring a secure axial support of the sheath end surfaces 35, 36 on the stop edges 47.

The invention claimed is:

1. A device for welding rod-shaped electrical conductors provided with an outer insulating sheath and having blank regions free of the sheath, whose length l is defined by an axial sheath end surface, the device comprising:
   a compression space for receiving connecting regions of conductors to be connected to each other, the compression space being limited in a first axial direction (z-axis) at two opposing sides by a working surface of a sonotrode transmitting ultrasonic vibrations in the first axial direction and by an opposing surface of an opposing electrode and in a second axial direction (y-axis) at two opposing sides by a limiting surface of a slider element displaceable in the second axial direction and by a limiting surface of a limiting element;
   at least one guiding element arranged laterally to the slider element and movable relative to the slider element in the second axial direction, and the at least one guiding element having a guiding edge for positioning a conductor in the second axial direction relative to the limiting surface of the limiting element, the at least one guiding element including a stop edge for axially positioning a sheath end surface of the conductor, the distance between the stop edge and the working surface of the sonotrode being selected in such a manner that when the sheath end surface abuts against the stop edge and the blank region is aligned in a third axial direction parallel to the working surface of the sonotrode and the limiting surface of the limiting element, a defined length l of the blank region extends within the compression space.

2. The device according to claim 1, in which the stop edge has an edge thickness smaller than 2 mm.

3. The device according to claim 2, in which the stop edge has an edge thickness smaller than 1.5 mm.

4. The device according to claim 2, in which the stop edge has an edge thickness smaller than 1 mm.

5. The device according to claim 1, in which the stop edge is formed by the guiding edge.

6. The device according claim 1, in which the at least one guiding element includes an adjusting device allowing positioning of the stop edge with respect to the working surface of the sonotrode in the third axial direction (x-axis).

7. The device according to claim 6, in which the adjusting device includes a coupling device between the at least one guiding element and the slider element.

8. The device according to claim 1, in which the stop edge is formed on a stop body arranged on the at least one guiding element.

9. The device according to claim 8, in which the stop body is connected to the at least one guiding element in an exchangeable manner.

* * * * *

UNITED STATES PATENT AND TRADEMARK OFFICE
CERTIFICATE OF CORRECTION

PATENT NO. : 10,406,628 B2
APPLICATION NO. : 15/035382
DATED : September 10, 2019
INVENTOR(S) : Heiko Strobel et al.

Page 1 of 1

It is certified that error appears in the above-identified patent and that said Letters Patent is hereby corrected as shown below:

In the Specification

Column 3, Lines 42-43, "space in" should be --space 18 in--.

Column 3, Line 53, "computer and" should be --computer 17 and--.

Column 4, Line 1, "element displaceable" should be --element 23 displaceable--.

Column 4, Line 2, "surface of" should be --surface 24 of--.

Column 5, Line 4, "node produced" should be --node 38 produced--.

Column 5, Line 29, "between and" should be --between 20° and--.

Column 5, Line 50, "edge of" should be --edge 47 of--.

Signed and Sealed this
Fifth Day of November, 2019

Andrei Iancu
*Director of the United States Patent and Trademark Office*